US008024789B2

(12) United States Patent
Kawakami et al.

(10) Patent No.: US 8,024,789 B2
(45) Date of Patent: Sep. 20, 2011

(54) COMMUNICATION APPARATUS, PROGRAM AND METHOD

(75) Inventors: Naoko Kawakami, Kawasaki (JP); Motohiro Uchiyama, Kawasaki (JP); Naoki Wada, Kawasaki (JP); Toshihide Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1253 days.

(21) Appl. No.: 11/137,148

(22) Filed: May 25, 2005

(65) Prior Publication Data
US 2006/0190721 A1 Aug. 24, 2006

(30) Foreign Application Priority Data

Feb. 21, 2005 (JP) ................................. 2005-043898

(51) Int. Cl.
*G06F 9/00* (2006.01)
*G06F 15/16* (2006.01)
*G06F 17/00* (2006.01)

(52) U.S. Cl. ............................................. 726/15; 726/1

(58) Field of Classification Search .................. 713/161; 726/15, 14, 4, 5, 6, 11, 12, 17, 1
See application file for complete search history.

(56) References Cited

U.S. PATENT DOCUMENTS

| | | | | |
|---|---|---|---|---|
| 5,892,912 A * | 4/1999 | Suzuki et al. | ............ | 370/395.53 |
| 5,892,922 A * | 4/1999 | Lorenz | ........................... | 709/238 |
| 5,914,938 A * | 6/1999 | Brady et al. | .................... | 370/254 |
| 5,978,378 A * | 11/1999 | Van Seters et al. | ........... | 370/401 |
| 6,269,098 B1 * | 7/2001 | Crayford | ........................ | 370/389 |
| 6,975,581 B1 * | 12/2005 | Medina et al. | ................. | 370/401 |
| 7,072,346 B2 * | 7/2006 | Hama | ....................... | 370/395.53 |
| 7,173,935 B2 * | 2/2007 | Lou et al. | ..................... | 370/395.5 |
| 7,251,687 B1 * | 7/2007 | McCullough | ................. | 709/224 |
| 7,283,746 B2 * | 10/2007 | Ikeda | ............................... | 398/46 |
| 7,350,077 B2 * | 3/2008 | Meier et al. | ..................... | 713/171 |
| 7,430,210 B2 * | 9/2008 | Havala et al. | ............. | 370/395.53 |
| 7,447,166 B1 * | 11/2008 | Kaluve et al. | ................. | 370/254 |
| 7,453,888 B2 * | 11/2008 | Zabihi et al. | ................... | 370/400 |
| 7,492,763 B1 * | 2/2009 | Alexander, Jr. | ................ | 370/389 |
| 7,548,541 B2 * | 6/2009 | Ishwar et al. | .................. | 370/390 |
| 7,586,895 B2 * | 9/2009 | Borgione | ....................... | 370/349 |
| 7,693,158 B1 * | 4/2010 | Carrie | ....................... | 370/395.53 |
| 7,703,018 B2 * | 4/2010 | Chaudhry et al. | ............. | 715/735 |
| 7,720,957 B2 * | 5/2010 | Graham et al. | ................ | 709/223 |
| 7,724,715 B2 * | 5/2010 | Meier | ........................... | 370/338 |

(Continued)

FOREIGN PATENT DOCUMENTS

JP 11-175476 7/1999

(Continued)

OTHER PUBLICATIONS

B. Aboba Microsoft, P. Calhoun Airespace RADIUS (remote authentication dial in user service) Sep. 2003.*

(Continued)

*Primary Examiner* — David García Cervetti
(74) *Attorney, Agent, or Firm* — Katten Muchin Rosenman LLP

(57) ABSTRACT

A communication apparatus comprises a storage unit for storing a first network list indicating plural networks; a receiving unit for receiving a second network list indicating plural networks from an outside by using a first authentication protocol; an operation unit for executing an AND operation by using the first network list and the second network list to create a transmission-use network list; and transmission unit for transmitting the transmission-use network list to the outside.

16 Claims, 22 Drawing Sheets

U.S. PATENT DOCUMENTS

| | | | |
|---|---|---|---|
| 7,953,089 B1 * | 5/2011 | Ramakrishnan et al. | 370/392 |
| 7,957,388 B2 * | 6/2011 | Medina et al. | 370/392 |
| 2004/0103282 A1 * | 5/2004 | Meier et al. | 713/171 |
| 2004/0172480 A1 * | 9/2004 | Hirose et al. | 709/238 |
| 2004/0208151 A1 * | 10/2004 | Haverinen et al. | 370/338 |
| 2004/0233234 A1 * | 11/2004 | Chaudhry et al. | 345/735 |
| 2005/0265329 A1 * | 12/2005 | Havala et al. | 370/389 |
| 2005/0265355 A1 * | 12/2005 | Havala et al. | 370/395.53 |
| 2006/0101278 A1 * | 5/2006 | Kobayashi | 713/182 |
| 2006/0101409 A1 * | 5/2006 | Bemmel | 717/126 |

FOREIGN PATENT DOCUMENTS

| | | |
|---|---|---|
| JP | 2003-132022 | 5/2003 |
| JP | 2004-23366 | 1/2004 |
| JP | 2004-072631 | 3/2004 |
| JP | 2004-357332 * | 12/2004 |
| JP | 2006-25065 | 1/2006 |

OTHER PUBLICATIONS

IEEE std 802.1X-2001 Port-Based Network Access Control. The Institute of Electrical and Electronics Engineers, Inc. Published Jul. 13, 2001.

C. Rigney et al. Remote Authentication Dial in User Service (RADIUS) Network Working Group, 2000.

B. Aboba et al. Extensible Authentication Protocol (EAP) Network Working Group, 2004.

* cited by examiner

FIG. 6

RADIUS protocol code=Access Request

Attribute Value Pairs

Vender Specific(26) Vender:xxxxxxx(211)

Vender ID=211

Vender type=1(FIELD OF VLAN ID)

Vender length:6

Attribute-Specific:"1-10"(VLAN ID)

FIG. 10

RADIUS protocol code=Access Request

Attribute Value Pairs

Vender Specific(26) Vender:xxxxxxx(211)

Vender ID=211

Vender type=2(FIELD OF VLAN list Request)

FIG. 14

```
RADIUS protocol
code=Access Challenge
Attribute Value Pairs
  EAP Message (79)
  Extensible Authentication protocol
  code:Request
   ID:1
   Length:-
   type: 255(Experimental types)
   type-data:
      sub-type:1(VLAN ID)
      length:-
      value:"1"(VLAN ID)
      sub-type:2(VLAN Name)
      length:-
      value:"default"(VALN Name)
       ........
       ........
      sub-type:1(VLAN ID)
      length:-
      value:"10"(VLAN ID)
      sub-type:2(VLAN Name)
      length:-
      value:"R&D"(VALN Name)
```

※Sub-type FIELD
Sub-type:1
  →VLAN ID
Sub-type:2
  →VLAN Name

FIG. 16

802.1×Authentication type:EAP Packet(0)

Extensible Authentication protocol code:Request

ID:

Length:- type: 255(Experimental types)

type-data:

sub-type(1):1(VLAN ID)

length:- value:"2"(VLAN ID)

FIG. 19

RADIUS protocol code=Access Request

Attribute Value Pairs t:EAP Massage(79)

Extensible Authentication protocol code:Request

ID:

Length:- type: 255(Experimental types)

type-data:

sub-type(1):1(VLAN ID)

length:- value:"2"(VLAN ID)

FIG. 21

RFC3748

5.8. Experimental

Description

The Experimental Type has no fixed format or content. It is intended for use when experimenting with new EAP Types. This Type is intended for experimental and testing purposes. No guarantee is made for interoperability between peers using this Type, as outlined in [RFC3692].

Type
  255

Type-Data
  Undefined

COMMUNICATION APPARATUS, PROGRAM AND METHOD

BACKGROUND OF THE INVENTION

The present invention relates to a communication apparatus, program and method enabling selection of a network at the time of authentication.

At present, 802.1X authentication is used as a function of limiting a communications by a user to a network. In the 802.1X authentication, an authentication switch or the like (Authenticator) authenticates a user terminal (Supplicant) in combination with an authentication server. The "Authenticator" and the "Supplicant" are terms used in the 802.1X; however, in the description below, are termed as the "authentication switch" and the "user terminal", respectively.

FIG. 22 is a flowchart showing a conventional procedure of user authentication processing in the 802.1X authentication. First, a user terminal 102 that is a computer or the like transmits a connection request to an authentication switch 104 by using an identification number (ID), a password, and the like. Upon receiving the connection request, the authentication switch 104 requests an authentication server 106 to authenticate the user terminal 102 that has transmitted the connection request. Upon receiving the authentication request from the authentication switch 104, the authentication server 106 authenticates the user terminal 102. The authentication server 106 notifies the user terminal 102 of an authentication result via the authentication switch 104. Then, it is made possible for the user terminal 102 to connect to the network.

Further, provided as an optional function to the 802.1X authentication is a function (Dynamic VLAN) of dynamically assigning a virtual LAN (VLAN) to each user terminal in the case of the user authentication. The dynamic VLAN function is a function in which the authentication server 106 assigns the VLAN to the authentication switch 104 by referring to a correspondence table between a user name registered in the authentication server 106 and the VLAN ("EAP Success" and "Radius Access Accept" of FIG. 22).

Further, as known technologies in which the authentication server selects authentication data under conditions designated by the user, the following are cited.

Patent document 1 discloses an authentication system that includes plural authentication modes, and allows selection and execution of the authentication mode according to attribute information other than a user name and a password which are inputted by the user.

Patent document 2 discloses a user authentication system that integrates user authentication systems for different services for use, thus enabling the user to enjoy various services by one ID and one password.

Patent document 3 discloses a user authentication system that shares the authentication server 106 and confidential information between a network A and a network B, and allows transmission of an authentication for the network B through the network A using the IEEE 802.1X and having high security.

[Patent document 1] JP 11-175476 A
[Patent document 2] JP 2003-132022 A
[Patent document 3] JP 2004-72631 A

SUMMARY OF THE INVENTION

In the conventional technologies, when a network (VLAN) is assigned to a user upon authentication, the user physically who moves over a wide range causes the following problems.

(1) Even if the user has an authorization to access plural networks, the user is connected to a network predetermined for each user terminal for use. Specifically, the user cannot select and access an arbitrary network away from home. Further, in the case where the user desires to access a network different from the network registered in the authentication switch, it is necessary to prepare a different user name for each different network, leading a problem with convenience.

Notification of the network is performed from the authentication server to the authentication switch by using an attribute of an authentication protocol (RADIUS protocol), and accordingly, is not transmitted to the user terminal. Therefore, the user terminal can not select the arbitrary network.

The present invention has been made in order to solve the problems as described above, and it is therefore an object of the present invention to provide a communication apparatus enabling a user having the authorization to access the plural networks to access the arbitrary network.

In order to achieve the above-mentioned object, there is provided a communication apparatus, including: a storage unit for storing a first network list indicating plural networks; a receiving unit for receiving a second network list indicating plural networks from an outside by using a first authentication protocol; an operation unit for executing an AND operation by using the first network list and the second network list to create a transmission-use network list; and a transmission unit for transmitting the transmission-use network list to the outside.

At the time of the authentication, the communication apparatus executes the AND operation by using the first network list and the second network list, and creates the transmission-use network list. Accordingly, the communication apparatus can transmit the transmission-use network list including only a network usable by the communication apparatus to the outside.

DESCRIPTION OF THE DRAWINGS

FIG. 6 is a diagram showing an example of a RADIUS message format to be transmitted to the authentication server.

FIG. 10 is a diagram showing an example of the RADIUS message format to be transmitted to the authentication server.

FIG. 14 is a diagram showing an example of a RADIUS message format to be transmitted to the authentication switch.

FIG. 16 is a diagram showing an example of an EAP message format to be transmitted to the authentication switch.

FIG. 19 is a diagram showing an example of the RADIUS message format to be transmitted to the authentication server.

FIG. 21 is a data format of Experimental in EAP.

DETAILED DESCRIPTION OF THE INVENTION

A communication apparatus according to an embodiment of the present invention is described below with reference to the drawings. A configuration of the embodiment is described merely as an example, and the present invention is not limited to the configuration of this embodiment. Note that the present invention is implementable by hardware and software. In the case of executing the present invention by software composed of programs, various functions can be realized by installing the programs composing the software in hardware such as a computer. Further, the programs are installed in the computer or the like through a communication line or by using a computer-readable storage medium.

Here, the computer-readable storage medium is a storage medium capable of accumulating data and information regarding a program by an electric, magnetic, optical, mechanical, or chemical function and allowing the data and the information to be read from the computer. Examples of the storage medium of such a type as to be detachable from a computer include a flexible disk, a magneto-optical disk, a CD-ROM, a CD-R/W, a DVD, a DAT, an 8-mm tape, and a memory card. Further, examples of the storage medium of such a type as to be fixed to a computer, include a hard disk, and a ROM (read only memory).

Figure 1:
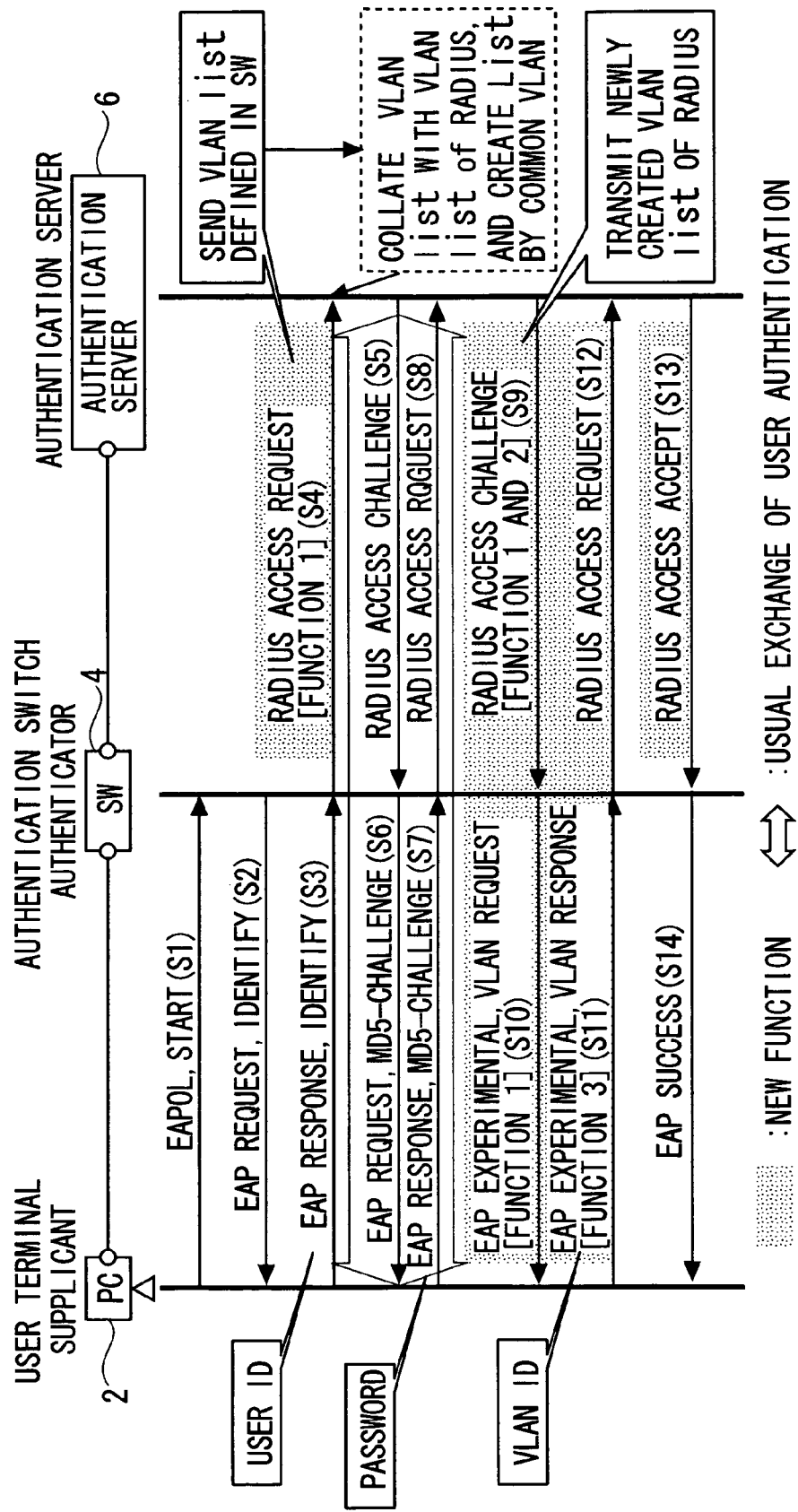
FIG. 1 is a flowchart showing a user authentication and a procedure of a user authentication realizing a LAN selection function.
Figure 2:
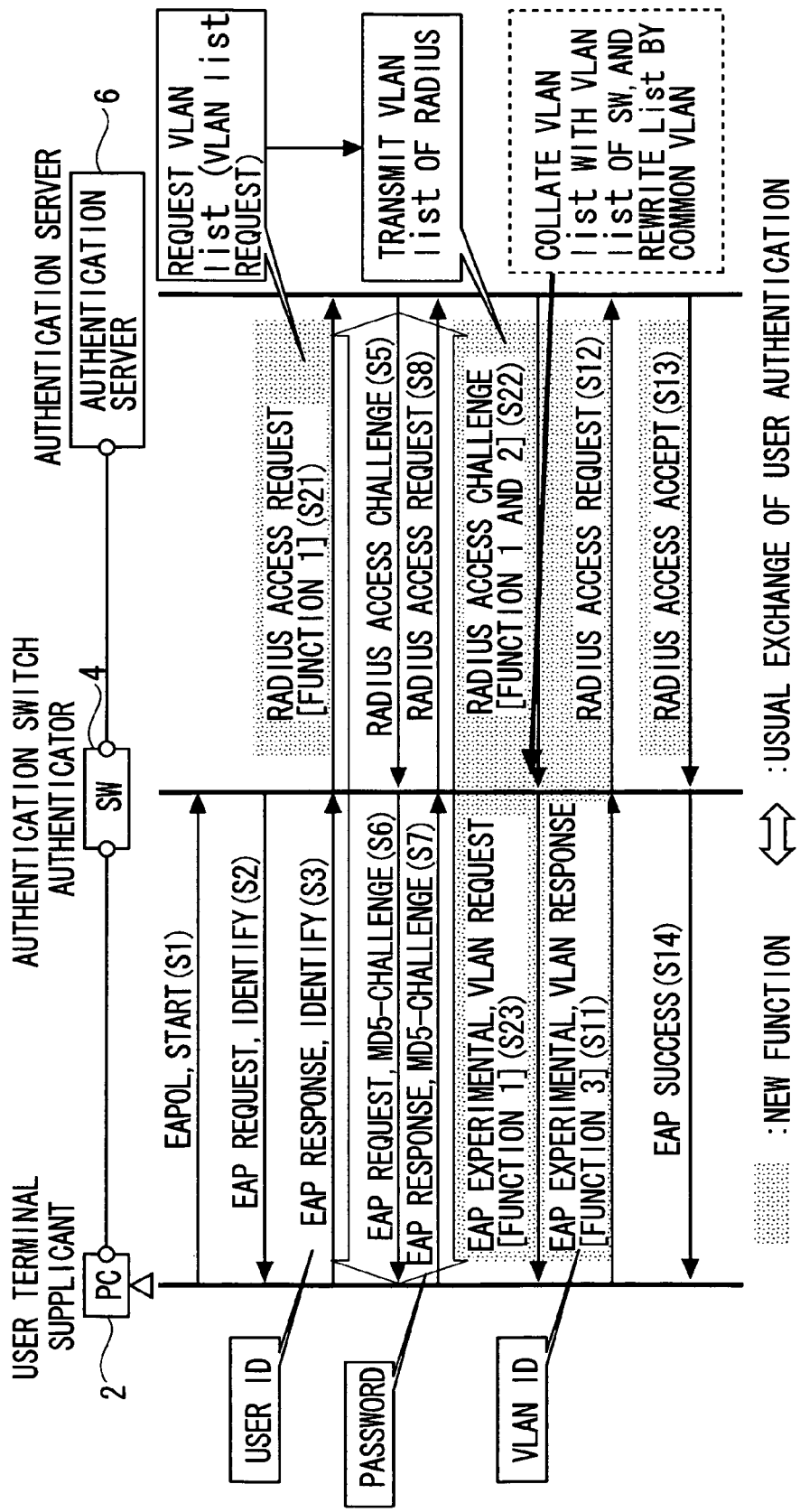
FIG. 2 is a flowchart showing a user authentication and a procedure of a user authentication realizing a LAN selection function.

FIG. 1 and FIG. 2 are flowcharts showing user authentications and procedures of user authentications realizing LAN selection functions. A function realizable in this embodiment is described below by taking as an example the EAP-MD5 authentication mode as shown in FIG. 2.

Here, the "EAP" is the abbreviation of "extensible Authentication Protocol", and is a protocol prepared by extending an authentication protocol PPP conventionally used for the dial-up connection and the like. In the IEEE 802.1X, the "EAP" is used as a standard protocol, and supports various authentication modes using a digital certificate, a smart card, and the like besides a user name and a password. The "IEEE 802.1X" is a standard for authenticating a terminal connected to a network instrument, and controlling an access thereof. In the case of using the IEEE 802.1X/EAP in a wireless LAN, a function of an 802.1X terminal (supplicant) is required for a wireless LAN client.

Each of FIG. 1 and FIG. 2 shows a procedure where a user terminal 2 (Supplicant) makes a request for a user authentication to an authentication server 6 (RADIUS server) through an authentication switch 4 (Authenticator), through a procedure where a VLAN is assigned to the user terminal 2. Note that those procedures depend on authentication methods, and accordingly, the procedures differ in different authentication methods. The user terminal 2 is a terminal installing the supplicant function of the 802.1X therein.

Three main functions provided in this embodiment are described below.

<Function 1>

The first function is a function (filtering function) of limiting the VLAN selectable by the user terminal 2 (authentication server 6, switch, and the like: FIG. 3 to FIG. 13). A realization method of the first function has the following two ways.

(Function 1(A): Transmission of VLAN List to Authentication Server 6)

The authentication switch 4 transmits, to the authentication server 6, a VLAN list (corresponding to a "second network list" of the present invention: list composed only of VLAN IDs or of user names and VLAN IDs) registered in the authentication switch 4 (FIG. 1, S4). Then, the authentication server 6 compares a VLAN list (corresponding to a "first network list" of the present invention: list composed only of VLAN IDs or of user names and VLAN IDs) registered in the authentication server 6 and the VLAN list transmitted from the authentication switch 4 with each other (AND operation). The authentication server 6 creates a VLAN list (corresponding to a "transmission-use VLAN list" of the present invention) including only VLAN IDs matching with each other as a result of the operation, and notifies the user terminal 2 of the VLAN list (S9, S10). The created VLAN list is a list that does not include VLAN IDs which do not match with the VLAN IDS in the VLAN list including only the VLAN IDs concerned. In this embodiment, the VLAN list transmitted to the user terminal 2 includes VLAN IDs and VLAN names.

(Function 1(B): Request for VLAN List to Authentication Server 6)

The authentication switch 4 requests the authentication server 6 to transmit the VLAN list (FIG. 2, S21). The authentication server 6 transmits the VLAN list (corresponding to the "second network list" of the present invention: list composed of user names and VLAN IDs) to the authentication switch 4 (S22). The authentication switch 4 compares the VLAN list (corresponding to the "first network list" of the present invention: list composed only of VLAN IDs or of user names and VLAN IDs) registered in the authentication switch 4 and the VLAN list transmitted from the authentication server 6 with each other (AND operation). The authentication switch 4 creates a VLAN list (corresponding to the "transmission-use VLAN list" of the present invention) including only VLAN IDs matching with each other as a result of the operation, and notifies the user terminal 2 of the VLAN list (S23).

The first network list is a VLAN list stored in the authentication switch 4 or the authentication server 6 on a device side where the AND operation is executed. The first network list includes network identification information (VLAN IDs), or user identification information (user names) and the network identification information (VLAN IDs).

The second network list is a VLAN list transmitted as data for executing the AND operation from the authentication switch 4 or the authentication server 6. The second network list is a list composed of the network identification information (VLAN IDs), or a list composed of the user identification information (user names) and the network identification information (VLAN IDs). The authentication switch 4 transmits the list composed of the network identification information (VLAN IDs) to the authentication server 6. Meanwhile, the authentication server 6 transmits the network identification information (user names and VLAN IDs) and network specifying information (VLAN IDs and VLAN names) to the authentication switch 4. However, the network specifying information is information to be used for visually specifying an arbitrary network by displaying character information by a user. Therefore, the object of the present invention is achievable by using the network identification information. Specifically, if the authentication switch 4 transmits usable VLAN IDs to the user terminal 2, it is made possible for the user to select the arbitrary VLAN.

<Function 2>

Figure 15:
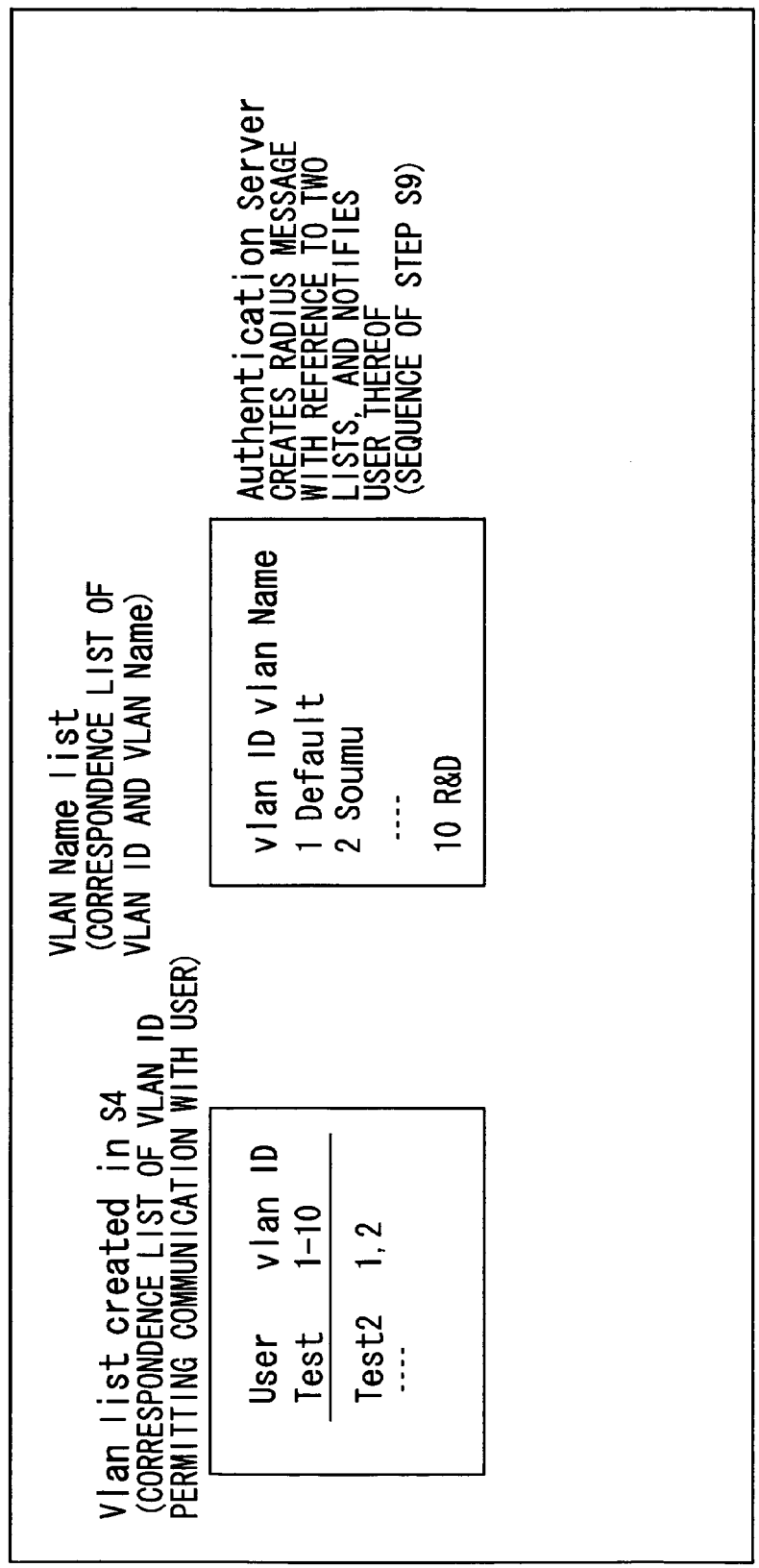
FIG. 15 is a diagram showing VLAN lists for use in creating the transmission-use VLAN list in the inside of the authentication server.

The second function is a function of transmitting a message created by correlating (mapping) the VLAN IDs and the VLAN Names with each other to the user terminal 2 in order to display the message thereon (authentication server 6: FIG. 15).

<Function 3>

Figure 17:
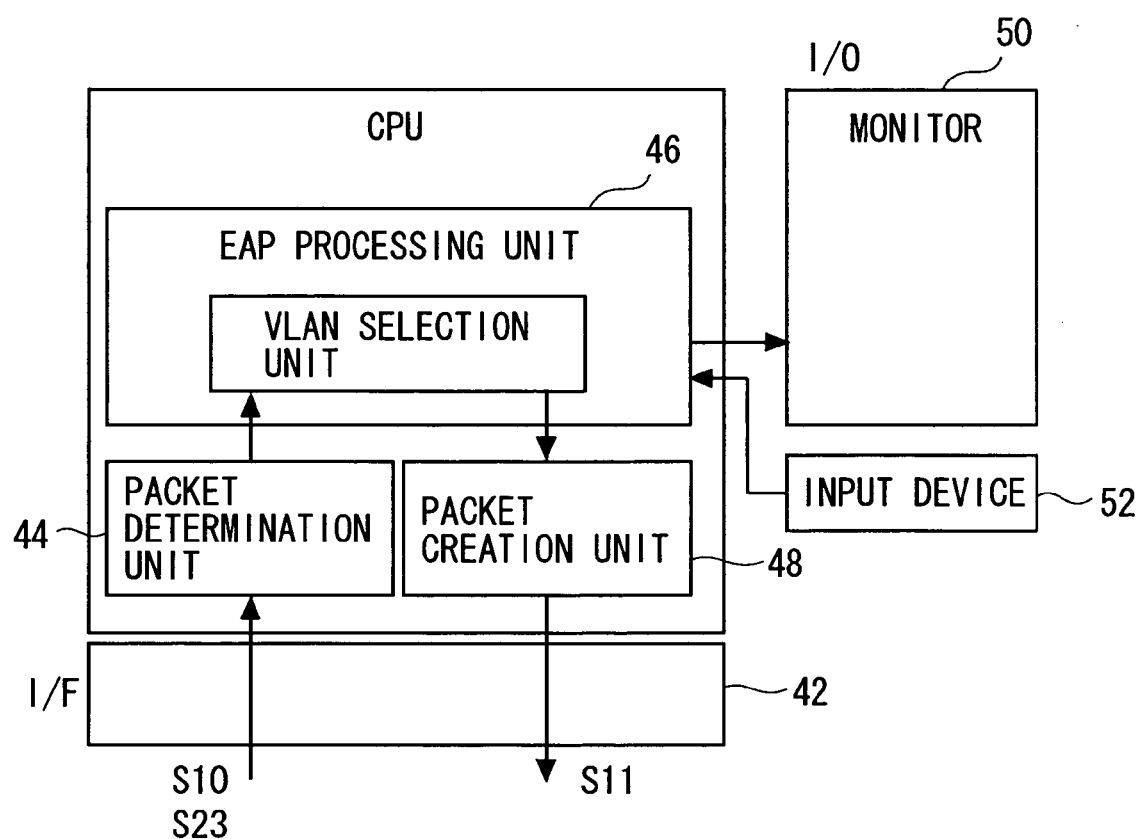
FIG. 17 is a functional block diagram showing an internal structure of a user terminal (Supplicant).
Figure 18:
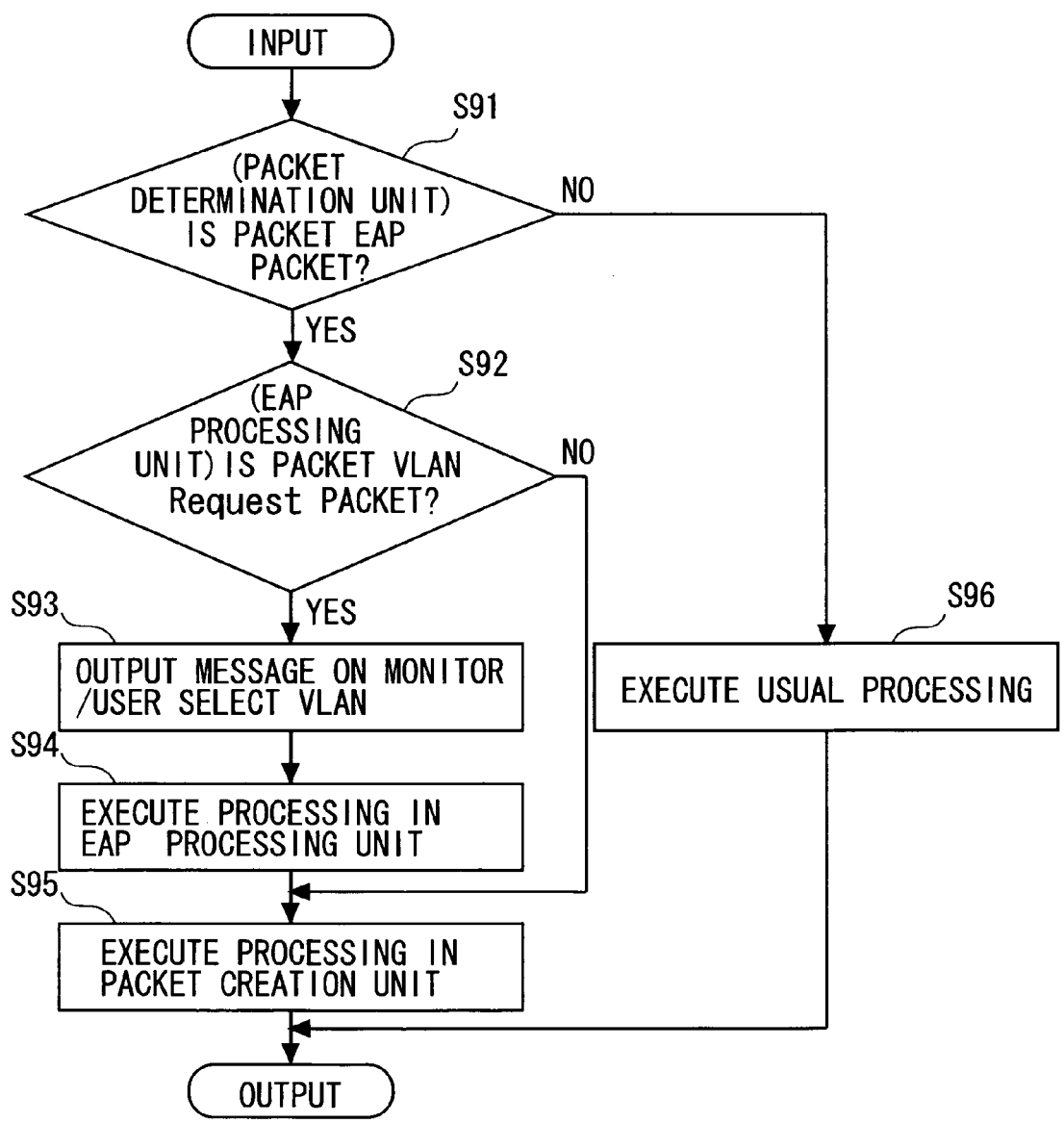
FIG. 18 is a flowchart for explaining an operation of the user terminal (Supplicant).

The third function is a function of enabling the user to select the VLAN arbitrarily (user terminal 2: FIG. 17, FIG. 18).

A procedure for realizing the functions is described below with reference to FIG. 1.

In step S1, the user terminal 2 transmits a connection request (communication request) to the network (authentication switch 4).

In step S2, the authentication switch 4 receives only an EAP packet from the user terminal 2, and requests the user terminal 2 to transmit a user ID thereof.

In step S3, the user terminal 2 transmits the user ID (user identification information) to the authentication switch 4.

In step S4, the authentication switch 4 transmits, to the authentication server 6, the communication request from the user terminal 2 (Function 1(A)). In this case, the authentication switch 4 also transmits the VLAN list registered in the authentication switch 4 to the authentication server 6.

In steps S5 and S6, the authentication server 6 requests, via the authentication switch 4, the user terminal 2 to transmit a password thereof.

In steps S7 and S8, the user terminal 2 transmits the password to the authentication server 6 via the authentication switch 4.

In step S9, after the user authentication, the authentication server 6 refers to (i) the VLAN list created in step S4 and (ii) the correspondence map (corresponding to "network specifying information" of the present invention) of the VLAN IDs and the VLAN Names in the authentication server 6, and compares both with each other. The authentication server 6 notifies the authentication switch 4 of a newly created VLAN list (transmission-use VLAN list) (Function 1 and Function 2).

In step S10, the authentication switch 4 inquires the user terminal 2 of a VLAN ID (VLAN Name) of the VLAN which the user terminal 2 desires to access. Specifically, the authentication switch 4 notifies the user terminal 2 of the VLAN list received from the authentication server 6 in step S9 (Function 1(A)).

In step S11, the user terminal 2 transmits the VLAN ID selected (designated) by the user, as a response to the inquiry from the authentication switch 4 (Function 3).

In step S12, the authentication switch 4 transmits the received VLAN ID to the authentication server 6 in order to request a permission for the access from the user terminal 2.

In step S13, the authentication server 6 transmits, to the authentication switch 4, the permission to access the VLAN ID designated by a result of collation thereof with the VLAN list.

In step S14, the authentication switch 4 transmits the access permission to the user terminal 2 in order to notify the user terminal 2 that the access thereof to the VLAN has been permitted. Upon receiving the access permission, the user terminal 2 can access the selected VLAN.

In the user authentication of FIG. 1, the example of creating the VLAN list in the authentication server 6 has been described. In FIG. 2, the authentication switch 4 creates a new VLAN list by using the VLAN list transmitted from the authentication server 6. steps S21 to S23 of FIG. 2, which are particularly different from the steps in FIG. 1, are described.

In step S21, upon receiving the communication request from the user terminal 2, the authentication switch 4 transmits a VLAN list Request to the authentication server 6 (Function 1(B)).

In step S22, after the user authentication, the authentication server 6 transmits the VLAN list registered in the authentication server 6 to the authentication switch 4.

In step S23, the authentication switch 4 refers to a correspondence map of the VLAN list (VLAN IDs and VLAN Names) requested in step S21 and the VLAN list of the authentication switch 4, and compares both of the VLAN lists with each other (FIG. 15). The authentication switch 4 notifies the user terminal 2 of a newly created VLAN list (Function 1 and Function 2).

Sequences of FIG. 1 and FIG. 2 are basically similar to those of the conventional user authentication according to the EAP-MD5. A technical feature (VLAN selection function) in this embodiment of present invention is shown in steps S4 and S9 to S12 of FIG. 1, and steps S21 to S23 and S11 to S13 of FIG. 2.

Figure 20:
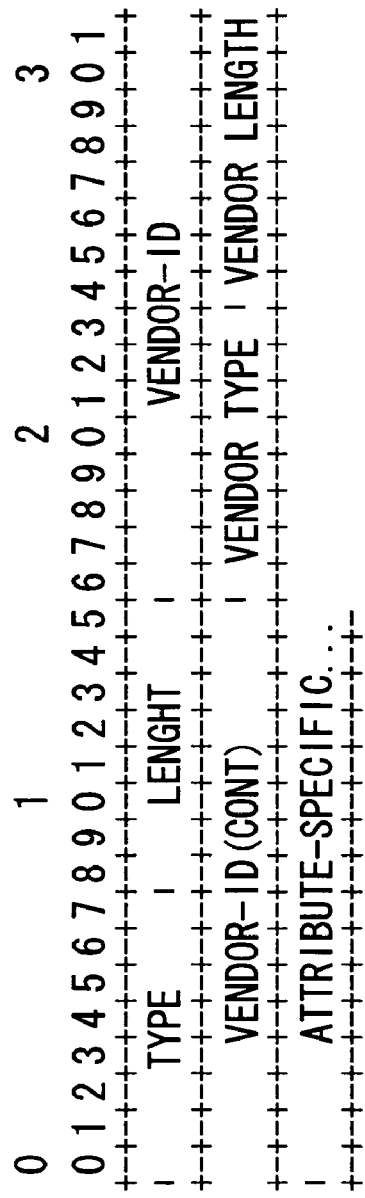
FIG. 20 is a data format of Vender Specific in RADIUS protocol.
Figure 22:
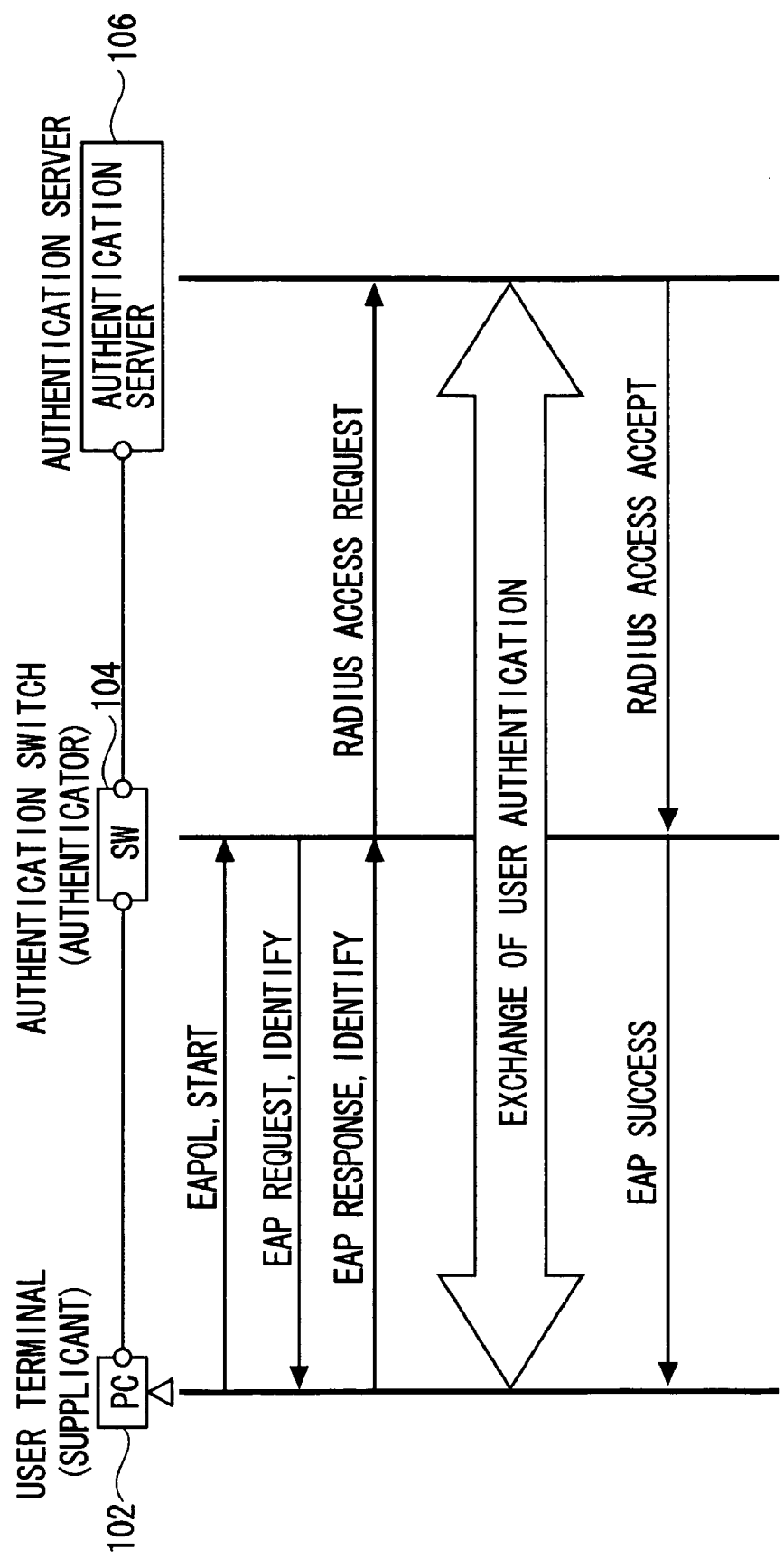
FIG. 22 is a flowchart showing a conventional procedure of user authentication processing in 802.1X authentication.

The technical feature can be realized by using Vender Specific Attribute (VSA) [26] defined by RFC2865 item 5.26 shown in FIG. 20 and Experimental types (EAP types) (255)) defined by RFC3748 item 5.8 shown in FIG. 21. The "Experimental types" do not have definitions in contents and a format, and is used in the case of performing a test and the like experimentally.

Figure 3:
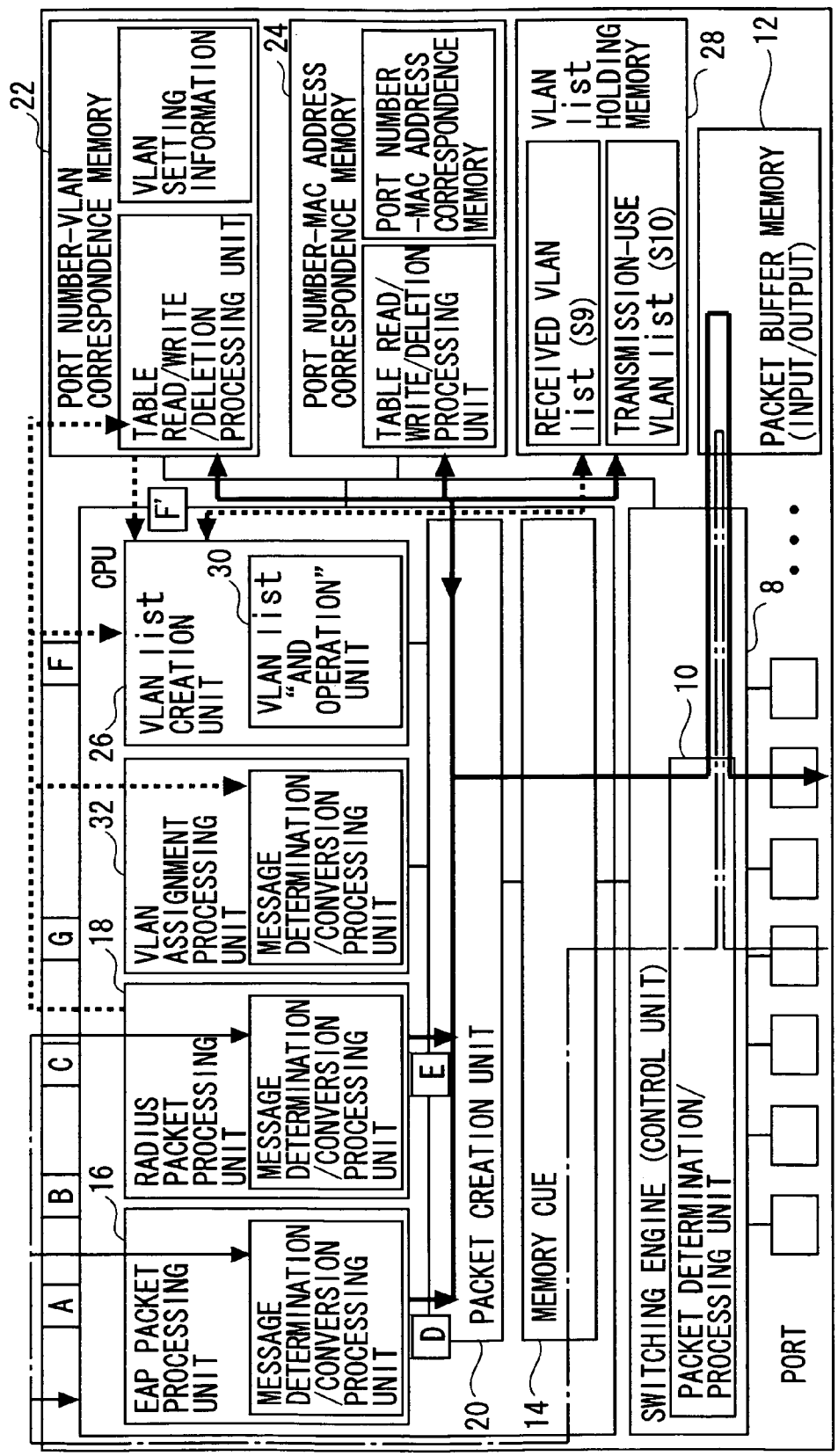
FIG. 3 is a diagram showing an internal structure of an authentication switch.

FIG. 3 is a diagram showing an internal structure of the authentication switch 4. Processing A to Processing G correspond to steps S1 to S14 and S21 to S23 of FIG. 1 and FIG. 2.

In the "Processing A", when the received message is determined to be an EAPOL message by a packet determination/processing unit 10 of a switching engine 8 (control unit), the EAPOL message is transferred to an EAP packet processing unit 16 through a packet buffer memory 12 and a memory cue 14 (step S1). The EAP packet processing unit 16 creates a user ID request message when the received message is the EAPOL message. Thereafter, the processing proceeds to "Processing D", where a user ID request (EAP Request, Identify) is transmitted to the user terminal 2 (step S2).

In the "Processing B", when the packet determination/processing unit 10 of the switching engine 8 (control unit) determines that the received message is an EAP packet, the EAP packet processing unit 16 converts the EAP packet into a RADIUS packet in order to transmit the EAP packet to the authentication server 6 (steps S3, S7, and S11). Then, the processing proceeds to the "Processing D".

In the "Processing C", when the packet determination/processing unit 10 of the switching engine 8 (control unit) determines that the received message is a RADIUS packet, a RADIUS packet processing unit 18 converts the RADIUS packet into an EAP packet in order to transmit the RADIUS packet to the user terminal 2 (steps S5, S9, and S13). Then, the processing proceeds to the "Processing E".

In the "Processing D", the EAP packet processing unit 16 issues a command to create a packet for each phase to a packet creation unit 20. Thereafter, an output port is decided with reference to a port number-VLAN correspondence memory 22 and a port number-MAC address correspondence memory 24, and the packet is transferred to the packet buffer memory 12 of the corresponding output port, and outputted from each port (steps S2, S4, S8, S12, and S21).

In the "Processing E", the command to create the packet for each phase is issued from the RADIUS packet processing unit 18 to the packet creation unit 20. Thereafter, the output port is decided with reference to the port number-VLAN correspondence memory 22 and the port number-MAC address correspondence memory 24, and the packet is transferred to the packet buffer memory 12 of the corresponding output port, and outputted from each port (steps S6, S10, and S14). Note that the authentication processing between the authentication switch and the authentication sever can be performed not only in the Layer 3 but also in a closed space of the Layer 2.

In the "Processing F (only Function 1(B))", when the RADIUS packet processing unit 18 determines that the received message is "Radius Access Challenge", and also receives the VLAN list from the authentication server 6, the transmission-use VLAN list for the user terminal 2 is created in a VLAN list creation unit 26 (S22).

From a VLAN list holding memory 28 (corresponding to a "storage unit" of the present invention), the VLAN list creation unit 26 reads the VLAN list received from the authentication server 6 and the VLAN list held by the authentication switch 4 itself, and creates the VLAN list composed of the matching VLAN IDs in an AND operation unit 30 (corresponding to the "operation unit" of the present invention). The RADIUS packet processing unit 18 converts the message into an EAP packet, and passes the EAP packet as the transmission-use VLAN list to the packet creation unit 20. Then, the processing proceeds to the "Processing E".

In the "Processing G", when the packet determination/processing unit 10 of the switching engine 8 (control unit) determines that the received message is "Radius Accept", the RADIUS packet processing unit 18 issues, to a VLAN assignment processing unit 32, a command to rewrite the VLAN ID described in the "Attribute" into information on the port concerned. The VLAN assignment processing unit 32 rewrites a table in the port number-VLAN correspondence memory 22.

Figure 4:
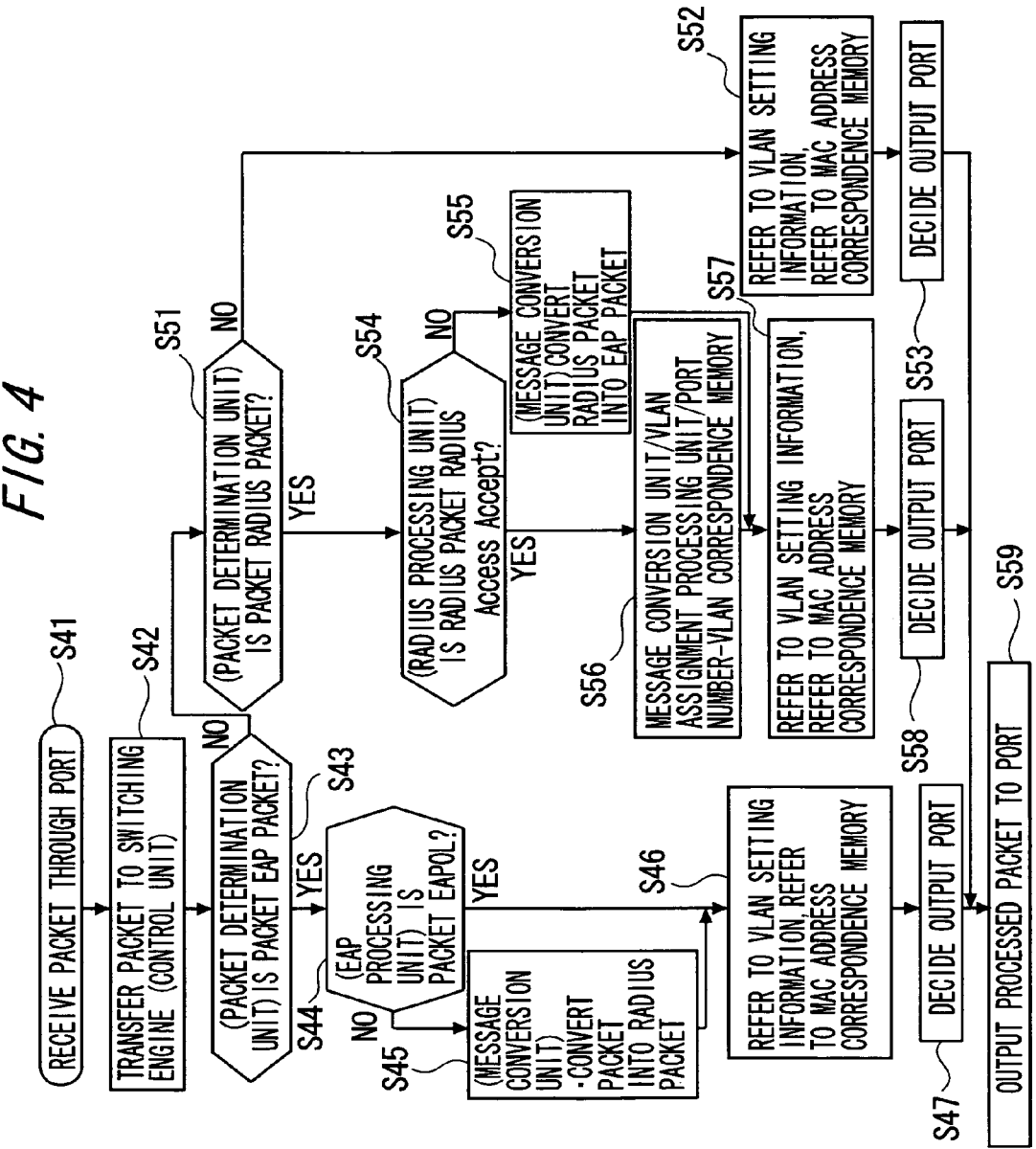
FIG. 4 is a flowchart showing operations in the authentication switch in the case of transmitting a VLAN list to an authentication server (Function 1(A)).
Figure 5:
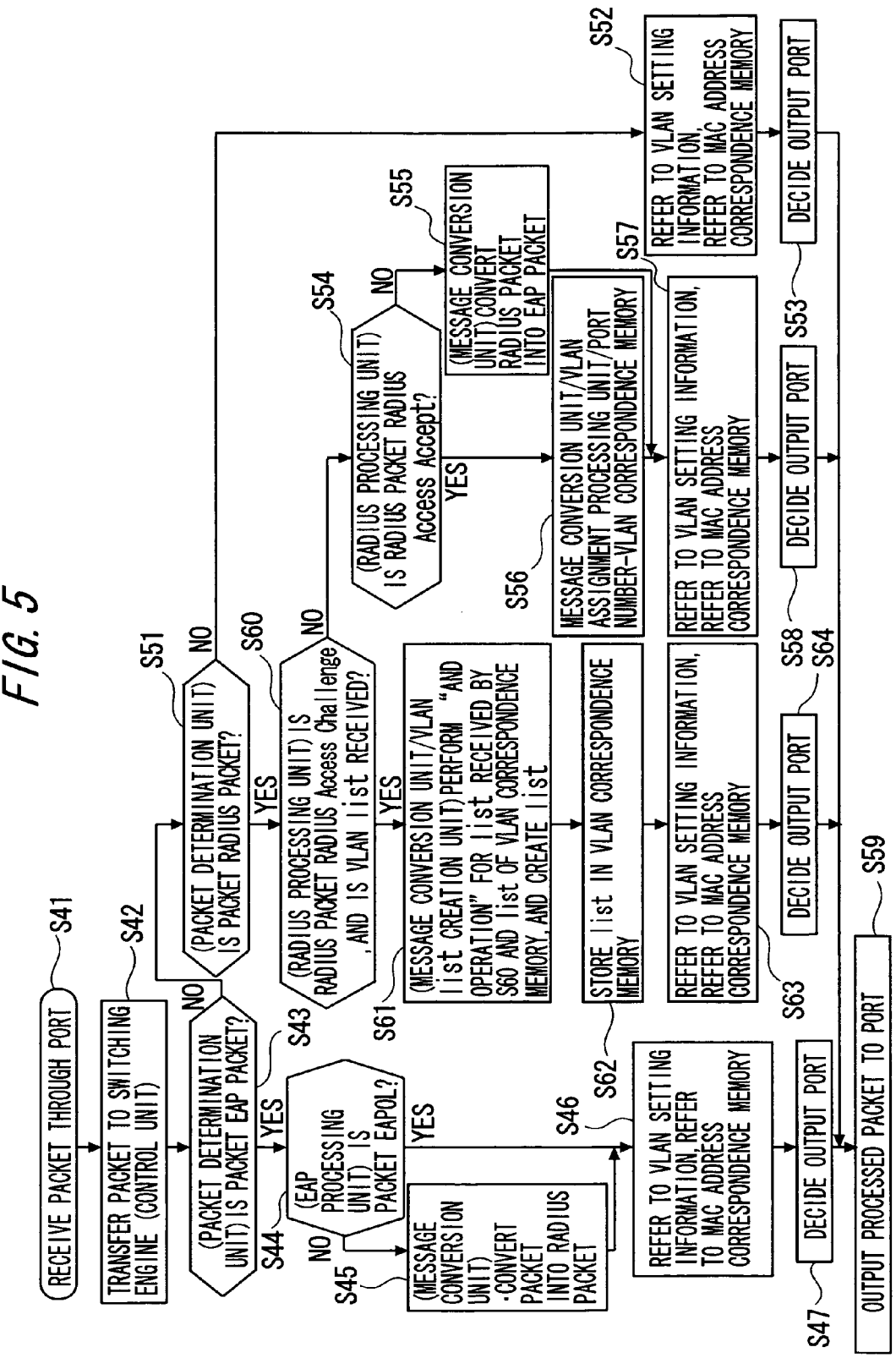
FIG. 5 is a flowchart showing operations in the authentication switch in the case of transmitting a VLAN list request to the authentication server (Function 1(B)).

FIG. 4 is a flowchart showing operations in the authentication switch 4 in the case of transmitting the VLAN list to the authentication server 6 (Function 1(A)). FIG. 5 is a flowchart in the authentication switch 4 in the case of transmitting the VLAN list request to the authentication server 6 (Function 1(B)). Regarding FIG. 5, steps S60 to S64 different from the steps in the Function 1(A) are described.

Upon receiving the packet from the user terminal 2 or the authentication server 6, the authentication switch 4 transfers the packet to the switching engine 8 (control unit) (S41 and S42). The packet determination/processing unit 10 determines whether or not the received packet is the EAP packet (S43). When the received packet is determined not to be the EAP packet, the processing proceeds to step S51.

When the received packet is determined to be the EAP packet, the received packet is passed to the EAP packet processing unit 16. Next, the EAP packet processing unit 16 determines whether or not the packet is the EAPOL message (S44). When the EAP packet is not the EAPOL message, a message conversion processing unit of the EAP packet processing unit 16 converts the EAP packet into the RADIUS packet (S45).

When the EAP packet is the EAPOL message, the EAP packet processing unit 16 passes the EAP packet to the packet creation unit 20, and the packet creation unit 20 decides the output port with reference to VLAN setting information and the port number-MAC address correspondence memory 24 (S46 and S47).

When the packet determination/processing unit 10 determines that the received packet is not the EAP packet, the packet determination/processing unit 10 determines whether or not the received packet is the RADIUS packet (S51). When the received packet is not the RADIUS packet, the packet determination/processing unit 10 passes the received packet to the packet creation unit 20, and the packet creation unit 20 decides the output port with reference to the VLAN setting information and the port number-MAC address correspondence memory 24 (S52 and S53).

When the received packet is the RADIUS packet, the packet creation unit 20 passes the RADIUS packet to the RADIUS packet processing unit 18. The RADIUS packet processing unit 18 determines whether or not the RADIUS packet is a "RADIUS Access Accept" message (S54). When the RADIUS packet is not the "RADIUS Access Accept" message, a message conversion processing unit of the RADIUS packet processing unit 18 converts the RADIUS packet into the EAP packet (S55).

When the RADIUS packet is the "RADIUS Access Accept" message, the RADIUS packet processing unit 18 issues, to the VLAN assignment processing unit 32, a command to rewrite the VLAN ID described in the "Attribute" into information on the port concerned. The VLAN assignment processing unit 32 rewrites the table in the port number-VLAN correspondence memory 22. The message conversion processing unit of the RADIUS packet processing unit 18 converts the RADIUS packet into the EAP packet (S56).

The RADIUS packet processing unit 18 passes the EAP packet to the packet creation unit 20, and the packet creation unit 20 decides the output port with reference to the VLAN setting information and the port number-MAC address correspondence memory 24 (S57 and S58). The packet processed as described above is outputted from the port to the user terminal 2 or the authentication server 6 (S59).

Next, steps S60 to S64 of FIG. 5 are described.

When the RADIUS packet processing unit 18 determines (i) that the received RADIUS packet is the "RADIUS Access Challenge" and (ii) that the RADIUS packet processing unit 18 has received the VLAN list from the authentication server 6, the RADIUS packet processing unit 18 passes the VLAN list to the VLAN list creation unit 26 (S60).

The VLAN list creation unit 26 compares the VLAN list registered in the port number-VLAN correspondence memory 22 and the VLAN list transmitted from the authentication server 6 with each other, and creates a new VLAN list (S61). The VLAN list creation unit 26 creates the VLAN list including only the VLAN IDs matching with each other as a result of the operation, and then writes the VLAN list into the port number-VLAN correspondence memory 22 (S62).

The VLAN list creation unit 26 passes the EAP packet to the packet creation unit 20, and the packet creation unit 20 decides the output port with reference to the VLAN setting information and the port number-MAC address correspondence memory 24 (S57 and S58). The packet processed as described above is outputted from the port to the user terminal or the authentication server 6 (S59).

FIG. 6 is a diagram showing an example of the RADIUS message format to be transmitted to the authentication server 6 (Function 1(A)). In addition to the usual attribute of the "RADIUS Access Request", the authentication switch 4 transmits the VLAN ID (Attribute-Specific: "1-10") defined for itself to the authentication server 6 by using the VSA (Vender Specific Attribute) (26). The authentication server 6 uses the VLAN ID (Attribute-Specific: "1-10") as shown in FIG. 6 in order to create the new VLAN list.

Figure 7:
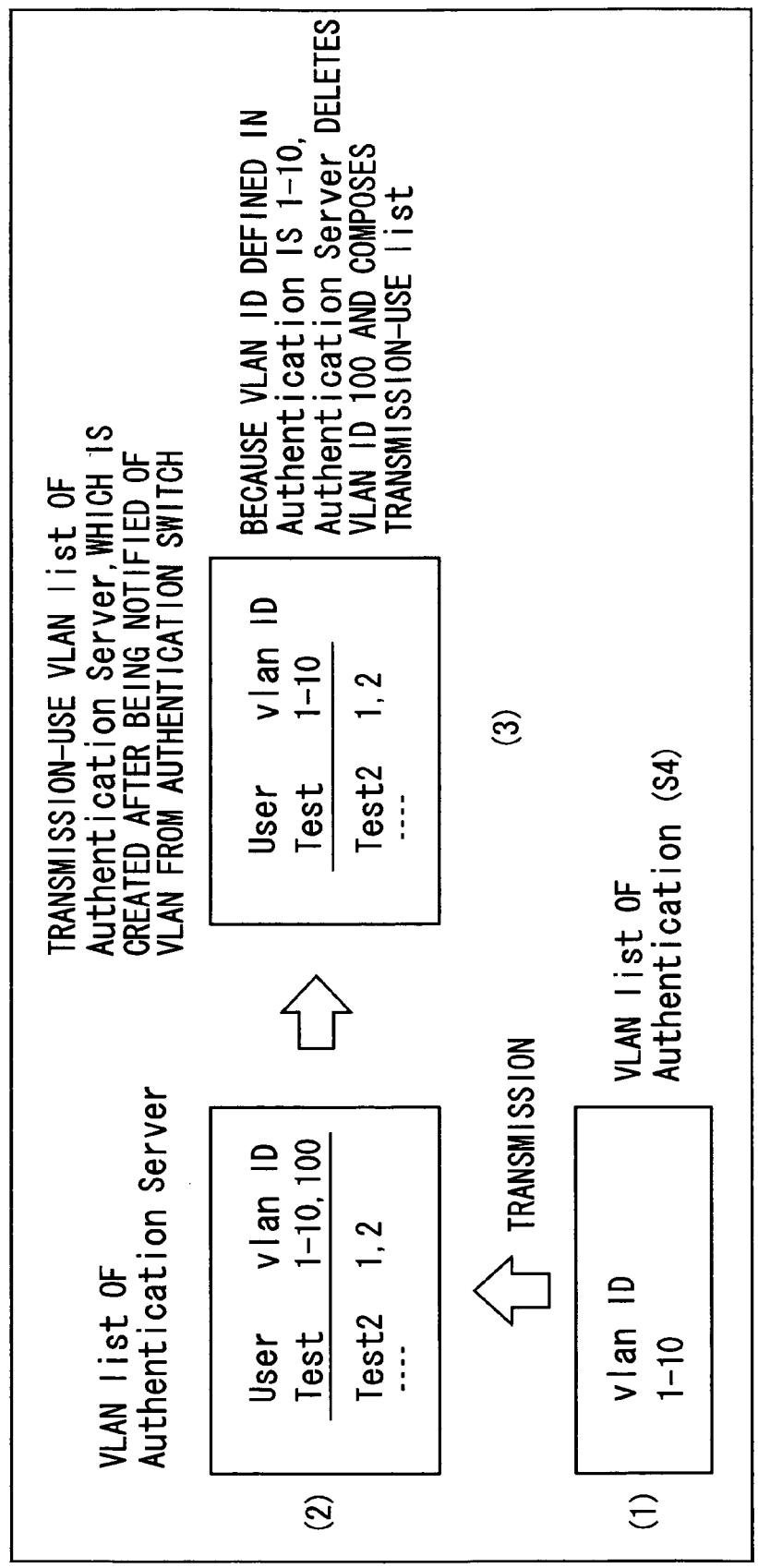
FIG. 7 is a diagram showing a procedure for creating a transmission-use VLAN list (new VLAN list) in an inside of the authentication server.
Figure 8:
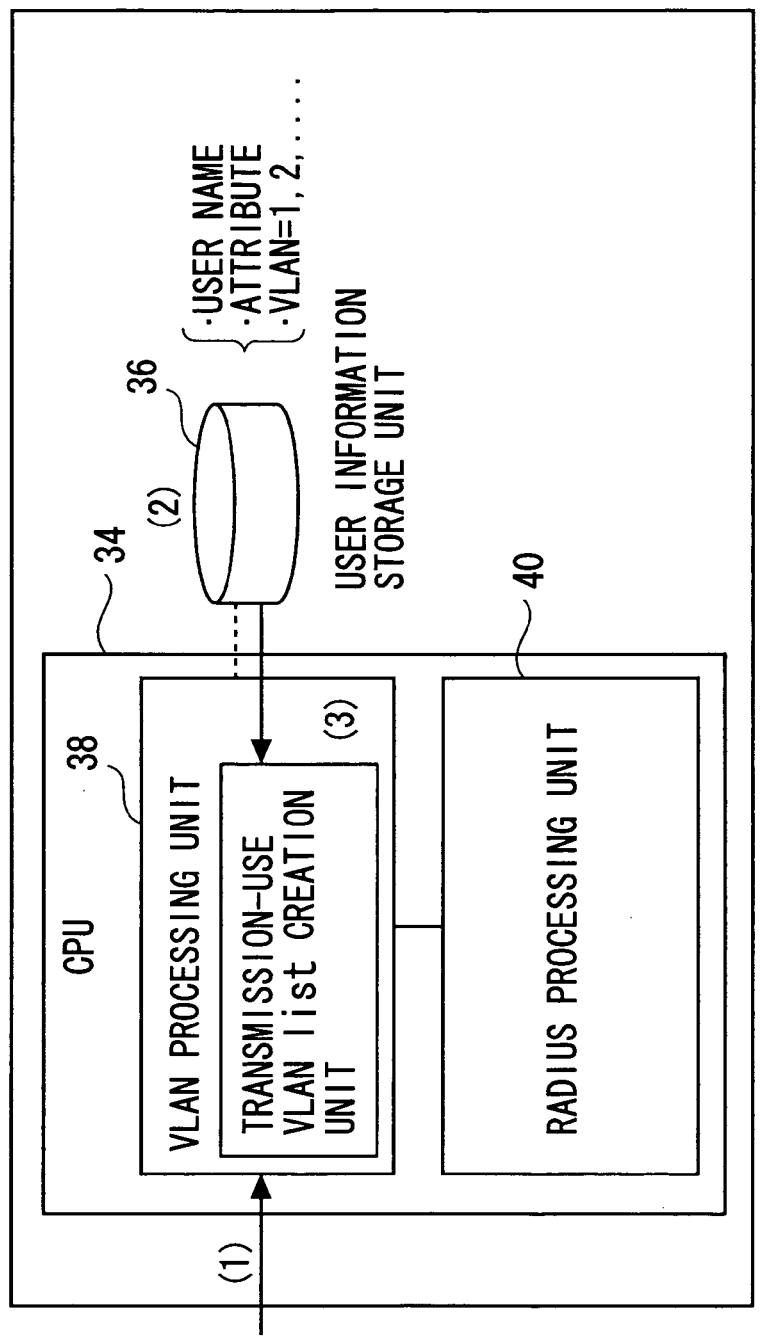
FIG. 8 is a diagram showing an internal structure of the authentication server.

FIG. 7 is a diagram showing a procedure for creating the transmission-use VLAN list (new VLAN list) in the inside of the authentication server 6. FIG. 8 is a diagram showing an internal structure of the authentication server 6.

The authentication server 6 collates the received VLAN ID and that in the VLAN list held thereby with each other, and newly creates the VLAN list composed only of the matching IDs. As shown in FIG. 8, the authentication server 6 is composed of a CPU 34 and a user information storage unit 36 (corresponding to a "storage unit" of the present invention). The CPU 34 includes a VLAN processing unit 38 and a RADIUS processing unit 40.

The user information storage unit 36 stores a VLAN list (2) of FIG. 7 in advance. The VLAN list (2) includes user names (Test and Test2), attributes, and VLAN IDs. The user information storage unit 36 stores a VLAN name list shown in FIG. 15 as well as the VLAN list shown in FIG. 7. A relationship between the VLAN list and the VLAN name list is described later.

The VLAN list (1) of the authentication switch 4, which is received in step S4 of FIG. 1, and the VLAN list (2) of the authentication server 6, are collated with each other in the VLAN processing unit 38. Here, the VLAN ID (Attribute-Specific: "1-10") is a VLAN ID by which the authentication switch 4 is communicable with the user terminal 2.

The user name "Test" of the authentication server 6 indicates that a VLAN ID "1-10, 100" is usable. However, the VLAN ID by which the authentication switch 4 having transmitted the VLAN list is communicable with the user terminal 2 is "1-10", and accordingly, the VLAN processing unit 38 deletes "100", and creates a transmission-use VLAN list including "Test 1-10" (corresponding to a function of the "operation unit" of the present invention). Then, the RADIUS processing unit 40 processes the created VLAN list, and transmits the VLAN list to the authentication switch 4.

Here, the data transmitted from the authentication switch 4 is only the VLAN ID. Upon receiving the transmission-use VLAN list, the authentication switch 4 collates the user ID received in step S3 of FIG. 1 and that in the transmission-use VLAN list with each other, and transmits the VLAN ID ("1-10" or "1, 2") for the user ID ("Test" or "Test2") to the user terminal 2.

Further, the transmission-use VLAN list received by the authentication switch 4 may solely be transmitted to the user terminal 2. In this case, the user terminal 2 collates the user ID in the transmission-use VLAN list and the user ID inputted in step S3 with each other, creates a display-use VLAN list, and displays the VLAN list on a display unit of the user terminal 2 so as to be selectable.

Figure 9:
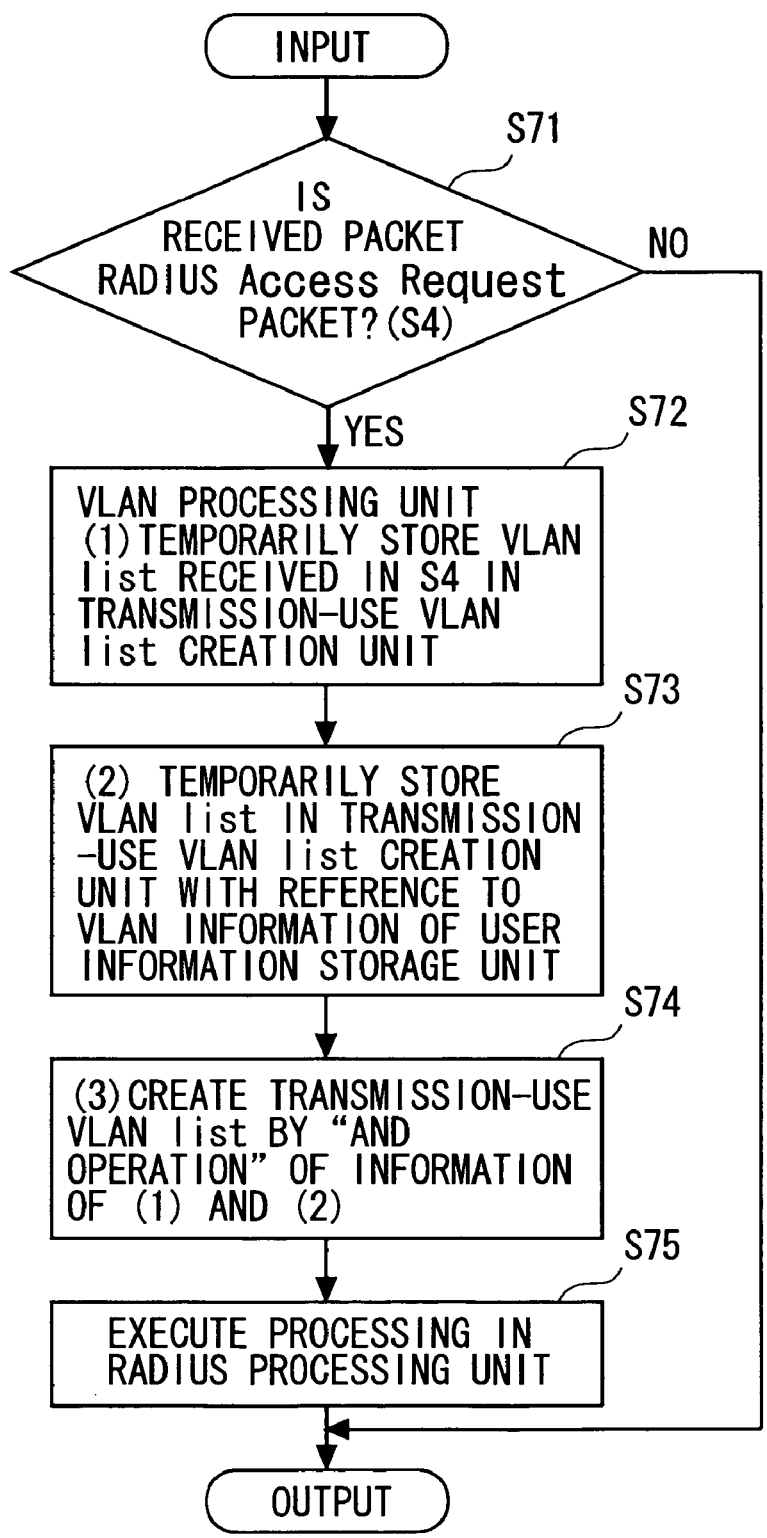
FIG. 9 is a flowchart showing processing where the authentication server creates the transmission-use VLAN list.

FIG. 9 is a flowchart showing processing where the authentication server 6 creates the transmission-use VLAN list. The processing corresponds to the processing of steps S4 to S9 of FIG. 1. Upon receiving the packet from the authentication switch 4, the authentication server 6 determines whether or not the received packet is a "RADIUS Access Request" (S71).

When the received packet is not the "RADIUS Access Request", the RADIUS processing unit 40 executes the authentication processing for the password, and the like (S75). Here, the user ID transmitted from the user terminal 2 is used for the authentication processing together with the password.

When the received packet is the "RADIUS Access Request" packet, the VLAN list processing unit 38 temporarily stores the VLAN list received from the authentication switch 4 in the transmission-use VLAN list creation unit (S72). The VLAN processing unit 38 temporarily stores the VLAN list in the transmission-use VLAN list creation unit with reference to the VLAN information such as the user name in the user information storage unit 36 (S73).

The transmission-use VLAN list creation unit creates the transmission-use VLAN list by using the temporarily stored VLAN list (1) and the VLAN list (2) (AND operation, S74). After the password authentication, the RADIUS processing unit 40 transmits the created transmission-use VLAN list as the "Access Challenge Request" packet to the authentication switch 4 (S75).

Next, operations where the authentication switch 4 transmits the VLAN list request to the authentication server 6 and executes the AND operation by using the received VLAN list are described with reference to FIG. 10 to FIG. 13.

FIG. 10 is a diagram showing an example of the RADIUS message format to be transmitted to the authentication server 6 (Function 1(B)). In addition to the usual attribute of the "RADIUS Access Request", the authentication switch 4 transmits the VLAN list request (Vender type=2) in order to request the VLAN list registered in the authentication server 6.

The authentication switch 4 transmits the VLAN list request by using the VSA (Vender Specific Attribute) (26). Upon receiving the VLAN list request, the authentication server 6 creates the transmission-use VLAN list by using the VLAN list held therein (FIG. 11 and FIG. 12).

Figure 11:
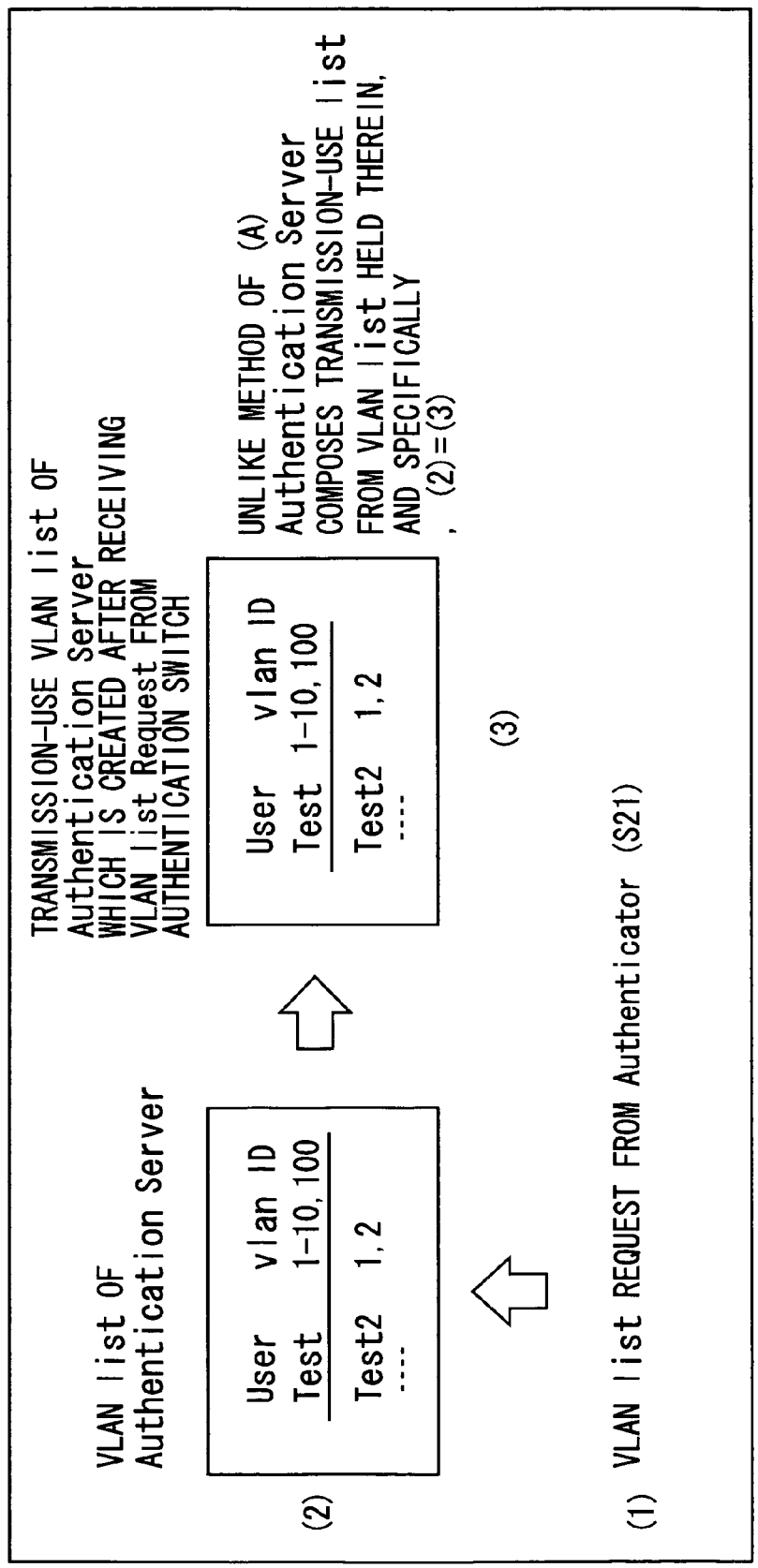
FIG. 11 is a diagram showing a procedure for creating a transmission-use VLAN list (held VLAN list) in the inside of the authentication server.
Figure 12:
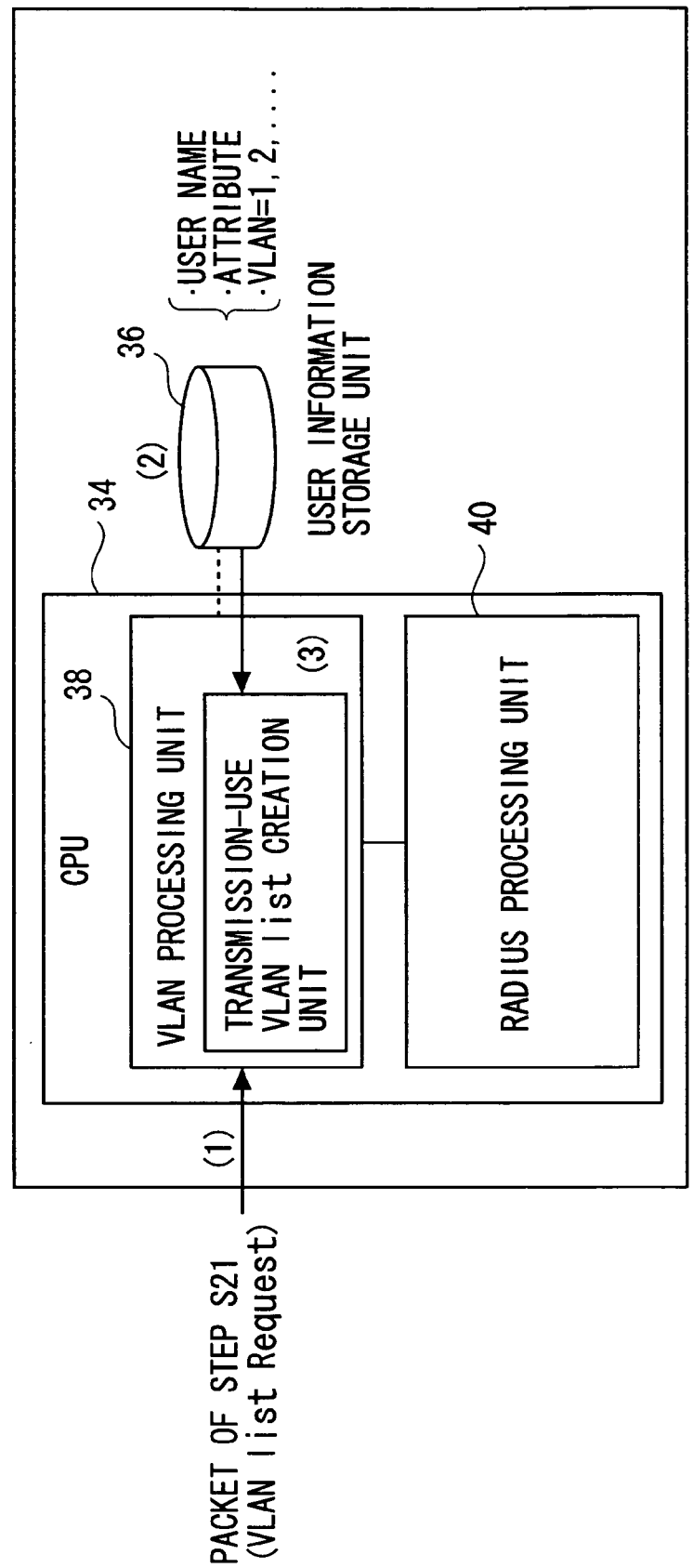
FIG. 12 is a diagram showing the internal structure of the authentication server.

FIG. 11 is a diagram showing a procedure for creating the transmission-use VLAN list (held VLAN list) in the inside of the authentication server 6. FIG. 12 is a diagram showing an internal structure of the authentication server 6.

Upon receiving the VLAN list request (1) from the authentication switch 4, the authentication server 6 reads out the VLAN list (2) from the user information storage unit 36. The VLAN processing unit 38 creates a transmission-use VLAN list (3) from the VLAN list (2) thus read out. Then, the RADIUS processing unit 40 processes the created VLAN list (3), and transmits the processed VLAN list (3) to the authentication switch 4.

In FIG. 11, the VLAN list is not transmitted from the authentication switch 4, and accordingly, the authentication server 6 transmits the read VLAN list to the user terminal 2 without creating a new VLAN list.

Figure 13:
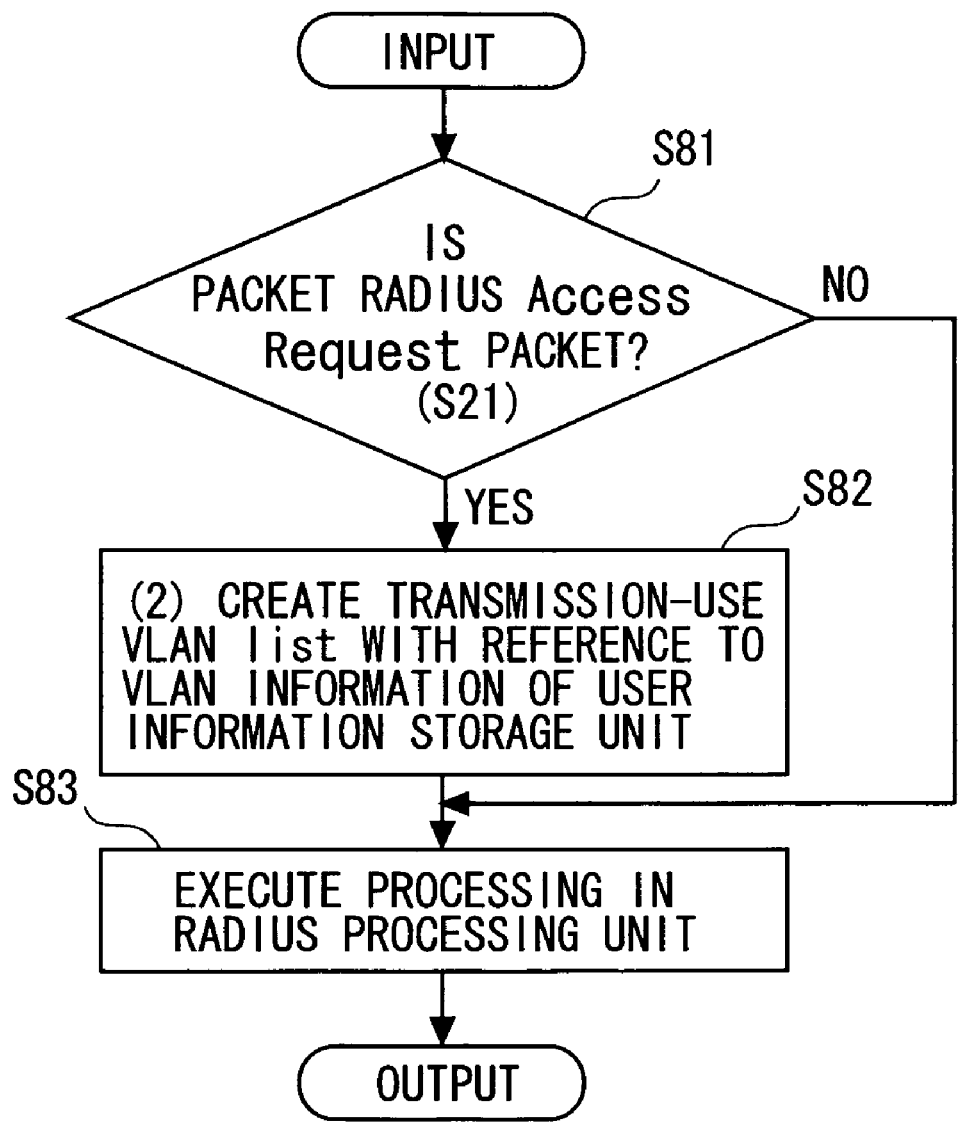
FIG. 13 is a flowchart showing processing where the authentication server creates the transmission-use VLAN list.

FIG. 13 is a flowchart showing processing where the authentication server 6 creates the transmission-use VLAN list. The processing corresponds to the processing of steps S21 and S22 of FIG. 2. Upon receiving the packet from the authentication switch 4, the authentication server 6 determines whether or not the received packet is the "RADIUS Access Request" packet (S81).

When the received packet is not the "RADIUS Access Request" packet, the RADIUS processing unit 40 executes the authentication processing for the password, and the like (S83). The user ID transmitted from the user terminal 2 is used for the authentication processing together with the password.

When the received packet is the "RADIUS Access Request" packet, the transmission-use VLAN list creation unit creates the transmission-use VLAN list (3) by using the VLAN list (2) (S82). After the password authentication, the RADIUS processing unit 40 transmits the created transmission-use VLAN list as the "Access Challenge Request" packet to the authentication switch 4 (S83).

FIG. 14 is a diagram showing an example of the RADIUS message format to be transmitted to the authentication switch 4. In FIG. 14, the RADIUS message format includes VLAN information of the VLAN IDs "1" to "10" and the VLAN names "Default" to "R&D". The "Sub-type: 1" is the "VLAN ID", and the "Sub-type: 2" is the "VLAN Name".

In order to notify the user "Test", who has made the request for the user authentication, of the VLAN IDs "1" to "10" by which the user "Test" is communicable with the authentication switch 4, the authentication server 6 creates and transmits the RADIUS message format of FIG. 14. As shown in FIG. 7, the authentication server shows that the user "Test" can use the VLAN IDs "1" to "10" and "100". However, "100" is not included in the VLAN IDs by which the authentication switch 4 can perform the communication, and accordingly, the VLAN IDs which the user "Test" can actually use become "1" to "10".

FIG. 15 is a diagram showing two VLAN lists for use in creating the transmission-use VLAN list in the inside of the authentication server 6. The authentication server creates the RADIUS message format shown in FIG. 14 with reference to the VLAN list and the VLAN name list which are created by executing the AND operation in step S4 of FIG. 1. The VLAN name list is a correspondence table of plural communication groups (corresponding to "networks" of the present invention) and the VLAN IDs, which are registered in the authentication server 6.

When the user who has executed the user authentication is the "Test2", the authentication server 6 creates a RADIUS message format including VLAN information of the VLAN IDs "1" and "2" and the VLAN names "Default" and "Soumu".

Alternatively, the authentication switch 4 may also execute an AND operation for creating the VLAN list to be transmitted to the user "Test2". For example, after the authentication server 6 transmits, to the authentication switch 4, only the VLAN IDs "1" to "10" by which the authentication switch 4 can perform the communication, the authentication switch 4 may compare the VLAN list received from the authentication server 6 and the VLAN list stored in the authentication switch 4 with each other, and may create the transmission-use VLAN list. In this case, the authentication switch 4 creates an EAP packet including the VLAN information of the VLAN IDs "1" and "2" and the VLAN names "Default" and "Soumu", and transmits the EAP packet to the user terminal 2.

Further, when making a notification of the transmission-use VLAN list (3) of FIG. 11, the RADIUS message format of FIG. 14 includes VLAN information of the VLAN ID "100" and a VLAN name "xxxx". When the AND operation is executed only by the authentication switch 4, the authentication switch 6 receives all of the VLAN name lists and the VLAN lists, which are registered in the authentication server.

As described above, after the user authentication, the authentication server 6 (authentication switch 4) notifies the user terminal 2 of the EAP packet (the usable VLAN ID) with reference to the (i) VLAN list created in step S4 (S21) and (ii) the correspondence map of the VLAN IDs and the VLAN names. The authentication switch 4 converts the received RADIUS message into the EAP message, and notifies the user terminal 2 of the usable VLAN ID (network).

The authentication switch 4 inquires the user terminal 2 of the VLAN ID (VLAN Name) of the VLAN which the user terminal 2 desires to access. The user terminal 2 displays the VLAN list on the display unit such as a display so as to make it possible to select the VLAN. By using an input device such as a mouse or a keyboard, the user selects the VLAN ID of the VLAN, which the user desires to access, and operates a "transmission" button and the like displayed on the display unit.

In response to the inquiry from the authentication switch 4, the user terminal 2 transmits the VLAN ID of the VLAN which the user terminal 2 desires to access. In an example shown in FIG. 16, the user terminal 2 transmits the VLAN ID "2" to the authentication switch 4.

Next, an internal structure and operation of the user terminal 2 are described with reference to FIG. 17 and FIG. 18. FIG. 17 is a functional block diagram showing the internal structure of the user 2 (Supplicant). FIG. 18 is a flowchart for explaining the operation of the user terminal 2.

The user terminal 2 includes an interface 42 for transmitting/receiving data to/from the outside, a packet determination unit 44 that determines a type of the received packet, an EAP processing unit 46 that processes the received EAP packet, a packet creation unit 48 that converts the processed data into the packet, a display unit 50 such as a monitor for displaying the data processed by the CPU, and an input device 52 such as a keyboard or a mouse for inputting and selecting the data.

Upon receiving the "EAP Experimental, vlan Request" packet from the authentication switch 4, the user terminal 2 passes the received packet to the packet determination unit 44 via the interface 42. The packet determination unit 44 determines the type of the received packet (S91). When the received packet is not the EAP packet, usual processing is executed for the received packet (S96). When the received packet is the EAP packet, the packet determination unit 44 passes the EAP packet to the EAP processing unit 46. When the EAP packet is determined to be the "EAP Experimental, vlan Request" packet, the EAP processing unit 46 passes the VLAN list including the selectable VLANs to the display unit 50 in order to allow the display unit 50 to display a message to prompt the VLAN selection. Upon receiving the data from the EAP processing unit 46, the display unit 50 displays the VLAN list including the selectable VLANs (S92).

When the user selects the desired VLAN ID (VLAN Name), the EAP processing unit issues, to the packet creation unit 48, a command to create a message with the format (FIG. 16) including the VLAN ID inputted by the user, and transmits the EAP packet (S94 and S95)

The authentication switch 4 converts the received EAP message into a RADIUS message shown in FIG. 19, and requests an access permission from the authentication server 6 (FIG. 1 and FIG. 2; S12).

According to the present invention, it is made possible for the user having the authorization to access the plural networks to access the arbitrary network.

What is claimed is:

1. A communication apparatus capable of communicating with a user terminal and another communication apparatus, comprising:
   a storage unit to store a first VLAN (Virtual Local Area Network) list indicating a plurality of VLANs enabling the communication apparatus to communicate with the user terminal;
   a receiving unit to receive a second VLAN list indicating a plurality of VLANs enabling the another communication apparatus to communicate with the user terminal and being usable by the user terminal from the another communication apparatus by using a first authentication protocol;

an operation unit to create a transmission-use VLAN list including VLAN identifiers for identifying a plurality of VLANs, each of which is included in both of the first VLAN list and the second VLAN list, and VLAN names of the plurality of VLANs identified by the VLAN identifiers; and a transmission unit to transmit the transmission-use VLAN list including the VLAN identifiers for identifying the plurality of VLANs available for the user terminal and the VLAN names to the user terminal to let a user of the user terminal select a desired VLAN from the plurality of VLANs identified by the VLAN identifiers included in the transmission-use VLAN list.

2. The communication apparatus according to claim 1, wherein the transmission unit transmits the transmission-use VLAN list by using a second authentication protocol different from the first authentication protocol.

3. The communication apparatus according to claim 2, wherein the second authentication protocol is an EAP (Extensible Authentication Protocol).

4. The communication apparatus according to claim 1, wherein the first authentication protocol is a RADIUS protocol.

5. The communication apparatus according to claim 1, further comprising a transmission request unit to request transmission of the second VLAN list to the another communication apparatus.

6. The communication apparatus according to claim 1, wherein the communication apparatus is an authentication switch, and the another communication apparatus is an authentication server.

7. A computer readable storage medium storing a program to be executed by a computer therein for causing the computer to perform communication operations with a user terminal and another communication apparatus, the communication operations comprising:

storing a first VLAN (Virtual Local Area Network) list indicating a plurality of VLANs enabling the computer to communicate with the user terminal;

receiving a second VLAN list indicating a plurality of VLANs enabling the another communication apparatus to communicate with the user terminal and being usable by the user terminal from the another communication apparatus by using a first authentication protocol;

creating a transmission-use VLAN list including VLAN identifiers for identifying a plurality of VLANs, each of which is included in both of the first VLAN list and the second VLAN list, and VLAN names of the plurality of VLANs identified by the VLAN identifiers; and transmitting the transmission-use VLAN list including the VLAN identifiers for identifying the plurality of VLANs available for the user terminal and the VLAN names to the user terminal to let a user of the user terminal select a desired VLAN from the plurality of VLANs identified by the VLAN identifiers included in the transmission-use VLAN list.

8. The computer readable storage medium storing the program therein for causing the computer to perform the communication operations according to claim 7, wherein the transmission-use VLAN list is transmitted by using a second authentication protocol different from the first authentication protocol.

9. The computer readable storage medium storing the program therein for causing the computer to perform the communication operations according to claim 8, wherein the second authentication protocol is an EAP (Extensible Authentication Protocol).

10. The computer readable storage medium storing the program therein for causing the computer to perform the communication operations according to claim 7, wherein the first authentication protocol is a RADIUS protocol.

11. The computer readable storage medium storing the program therein for causing the computer to perform the communication operations according to claim 7, further comprising requesting transmission of the second VLAN list to the another communication apparatus.

12. A communication method executed by a communication apparatus including a storage unit, comprising:

storing a first VLAN (Virtual Local Area Network) list indicating a plurality of VLANs enabling the communication apparatus to communicate with a user terminal in the storage unit;

receiving a second VLAN list indicating a plurality of VLANs enabling another communication apparatus to communicate with the user terminal and being usable by the user terminal from the another communication apparatus by using a first authentication protocol;

creating a transmission-use VLAN list including VLAN identifiers for identifying a plurality of VLANs, each of which is included in both of the first VLAN list and the second VLAN list, and VLAN names of the plurality of VLANs identified by the VLAN identifiers; and transmitting the transmission-use VLAN list including the VLAN identifiers for identifying the plurality of VLANs available for the user terminal and the VLAN names to the user terminal to let a user of the user terminal select a desired VLAN from the plurality of VLANs identified by the VLAN identifiers included in the transmission-use VLAN list.

13. The communication method according to claim 12, wherein the transmission-use VLAN list is transmitted by using a second authentication protocol different from the first authentication protocol.

14. The communication method according to claim 13, wherein the second authentication protocol is an EAP (Extensible Authentication Protocol).

15. The communication method according to claim 12, wherein the first authentication protocol is a RADIUS protocol.

16. The communication method according to claim 12, further comprising requesting transmission of the second VLAN list to the another communication apparatus.

* * * * *